(12) United States Patent
Nagai et al.

(10) Patent No.: US 10,418,886 B2
(45) Date of Patent: Sep. 17, 2019

(54) METHOD FOR MANUFACTURING LAMINATED CORE

(71) Applicant: MITSUI HIGH-TEC, INC., Kitakyushu-shi, Fukuoka (JP)

(72) Inventors: Akira Nagai, Fukuoka (JP); Shogo Tezuka, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 151 days.

(21) Appl. No.: 15/110,249

(22) PCT Filed: Jan. 8, 2015

(86) PCT No.: PCT/JP2015/050330
§ 371 (c)(1),
(2) Date: Jul. 7, 2016

(87) PCT Pub. No.: WO2015/105133
PCT Pub. Date: Jul. 16, 2015

(65) Prior Publication Data
US 2016/0329783 A1 Nov. 10, 2016

(30) Foreign Application Priority Data

Jan. 10, 2014 (JP) .................. 2014-003486
Dec. 3, 2014 (JP) .................. 2014-245095

(51) Int. Cl.
*H02K 15/02* (2006.01)
*H02K 15/03* (2006.01)

(52) U.S. Cl.
CPC .......... *H02K 15/022* (2013.01); *H02K 15/02* (2013.01); *H02K 15/03* (2013.01)

(58) Field of Classification Search
CPC ...... H02K 15/02; H02K 15/022; H02K 15/03; B29C 65/749; B29C 65/7802; B29C 65/7805; B29C 65/7832
See application file for complete search history.

(56) References Cited

U.S. PATENT DOCUMENTS

| | | |
|---|---|---|
| 4,538,345 A | 9/1985 | Diederichs |
| 2003/0151327 A1 | 8/2003 | Ramirez |

(Continued)

FOREIGN PATENT DOCUMENTS

| | | |
|---|---|---|
| CN | 101326698 | 12/2008 |
| CN | 101375484 | 2/2009 |

(Continued)

OTHER PUBLICATIONS

Translation of JP 10-127015, May 15, 1998, Japan.*
(Continued)

*Primary Examiner* — George R Koch
(74) *Attorney, Agent, or Firm* — Greenblum & Bernstein, P.L.C.

(57) ABSTRACT

The method includes a step of aligning and laminating enlarged iron core pieces including iron core pieces and dummy piece parts and forming a composite laminated iron core integrally including a dummy laminated part with the dummy piece parts laminated and a laminated iron core, a step of placing and positioning the composite laminated iron core on a jig and removing the dummy laminated part, and a step of mutually bonding the laminated iron core body with the dummy laminated part removed to form the laminated iron core.

24 Claims, 18 Drawing Sheets

(56) References Cited

U.S. PATENT DOCUMENTS

| | | | |
|---|---|---|---|
| 2009/0026872 A1 | 1/2009 | Tomohara et al. | |
| 2009/0072655 A1 | 3/2009 | Sano et al. | |
| 2013/0000455 A1* | 1/2013 | Kaiser | H02K 15/02 83/40 |
| 2014/0196276 A1* | 7/2014 | Nagai | H02K 15/03 29/598 |

FOREIGN PATENT DOCUMENTS

| | | |
|---|---|---|
| CN | 102931740 | 2/2013 |
| JP | 10-127015 | 5/1998 |
| JP | 10-322945 | 12/1998 |
| JP | 2003-529309 | 9/2003 |
| JP | 2005-287134 | 10/2005 |

OTHER PUBLICATIONS

Search Report issued in Japan Patent Application No. PCT/JP2015/050330, dated Mar. 17, 2015.

Office Action issued in Canada Counterpart Patent Appl. No. 2936169, dated Mar. 7, 2018.

Office Action issued in China Counterpart Patent Appl. No. 2015800042582.5, dated Jan. 4, 2018, along with an English translation thereof.

* cited by examiner

METHOD FOR MANUFACTURING LAMINATED CORE

This application is a 371 of PCT/JP2015/050330, filing date Jan. 8, 2015.

TECHNICAL FIELD

The present invention relates to a method for manufacturing a laminated iron core by removing a dummy laminated part after iron core pieces including dummy piece parts are laminated.

BACKGROUND ART

As a method for manufacturing a laminated iron core, for example, a method for laminating iron core pieces with a thickness of 0.3 mm or less and bonding the iron core pieces by caulking etc. is widely implemented. However, the bonding by the caulking has a problem that the iron core pieces conduct in a lamination direction and eddy current loss is caused and motor performance is decreased. Also, in the case of the caulking bonding, the adjacent iron core pieces are pressed in and fitted by the caulking, with the result that shape accuracy is influenced, for example, a warp occurs on a surface of the laminated iron core, or straightness is decreased.

In order to solve the problems described above, a manufacturing method described in Patent Literature 1 is proposed. FIGS. 17(A) and 17(B) are diagrams showing the manufacturing method described in Patent Literature 1. As shown in FIGS. 17(A) and 17(B), the method for injecting a resin 82 into a bond hole 81 formed by communicating a through hole bored in iron core pieces 80 in a lamination direction and curing the resin 82 to thereby bond the iron core pieces 80 in a laminated state to manufacture a laminated iron core 83 is proposed. Since the resin 82 is an insulator, the adjacent iron core pieces 80 do not conduct and further, a decrease in shape accuracy due to an influence of caulking is eliminated.

However, Patent Literature 1 does not describe a step of blank and laminating the iron core pieces 80 to a step of injecting the resin 82, a conveyance method and a conveyance form. The ejected iron core pieces 80 can be conveyed one by one, but there is a problem that conveyance becomes complicated and trouble with handling in the next step is taken and workability is bad. Also, when the iron core pieces are conveyed one by one, the iron core piece is directly gripped by conveyance means and the iron core piece with a thin thickness may be deformed, and there is a problem of influencing quality of a product.

In order to solve the problems described above, a manufacturing method described in Patent Literature 2 is proposed. FIGS. 18(A) and 18(B) are diagrams showing the manufacturing method described in Patent Literature 2. As shown in FIGS. 18(A) and 18(B), a composite iron core piece 95 including iron core pieces 91 and dummy piece parts 93 joined to the iron core pieces 91 through joining piece parts 92 is blanked and formed, and this composite iron core piece 95 is caulked and laminated through caulking 93a formed in the dummy piece parts 93, and a composite laminated iron core 99 having a laminated iron core 96 used as a product, joining parts 97 and dummy laminated parts 98 is formed. Then, it is contemplated to apply the method for bonding the laminated iron core 96 by a weld part 100 formed on a side surface and cutting the dummy laminated parts 98 at the joining parts 97 and manufacturing the laminated iron core 96.

CITATION LIST

Patent Literature

Patent Literature 1: JP-T-2003-529309
Patent Literature 2: JP-A-10-127015

SUMMARY OF INVENTION

Technical Problem

In this method described in Patent Literature 2, there is no conduction between the iron core pieces 91 since the laminated iron core 96 is not formed with the caulking 93a, but the laminated iron core 96 is bonded with the caulked and bonded dummy laminated parts 98 left, with the result that accuracy of the caulking part is reflected in the product. Since the caulking is generally performed by pressing and fitting a caulking protrusion of the iron core piece of an upper layer into a caulking hole part of the iron core piece of a lower layer, an influence on shape accuracy due to the caulking 93a remains in the laminated iron core 96. Also, even in the case of using other means such as welding or adhesion, accuracy at the time of temporary bonding leads to accuracy of a product shape, with the result that bonding with high accuracy is required from the time of bonding the dummy piece parts 93.

The present invention has been implemented in view of such circumstances, and an object of the present invention is to provide a method for manufacturing a laminated iron core with upper and lower iron core pieces bonded with high position accuracy regardless of accuracy of a dummy laminated part annexed to the laminated iron core.

Solution to Problem

A method for manufacturing a laminated iron core according to a first aspect of the present invention to achieve the object described above is a method for blanking and forming enlarged iron core pieces including iron core pieces and dummy piece parts and laminating the enlarged iron core pieces and removing a dummy laminated part with the dummy piece parts laminated to manufacture the laminated iron core, and includes a step of aligning and laminating the enlarged iron core pieces and forming a composite laminated iron core integrally including the dummy laminated part and the laminated iron core, a step of placing the composite laminated iron core on a jig and positioning the composite laminated iron core and removing the dummy laminated part, and a step of mutually bonding each of the iron core pieces of the laminated iron core with the dummy laminated part removed.

A method for manufacturing a laminated iron core according to a second aspect of the present invention to achieve the object described above is a method for blanking and forming enlarged iron core pieces including iron core pieces and dummy piece parts and laminating the enlarged iron core pieces and removing a dummy laminated part with the dummy piece parts laminated to manufacture the laminated iron core, and includes a step of aligning and laminating the enlarged iron core pieces and forming a composite laminated iron core integrally including the dummy laminated part and the laminated iron core, a step of removing the dummy laminated part and placing the remaining laminated iron core on a jig and positioning the remaining laminated iron core, and a step of mutually bonding each of the iron core pieces of the laminated iron core with the dummy laminated part removed.

In the method for manufacturing the laminated iron core according to the first or the second aspect of the present invention, preferably, a resin bond part of the laminated iron core is filled with a resin to mutually bond each of the iron core pieces. Also, the dummy piece parts are preferably temporarily bonded. The dummy piece part may be directly joined to the iron core piece, or may be joined to the iron core piece through a joining piece part. In the case of joining through the joining piece parts, the laminated joining piece parts (that is, a joining part) join the dummy laminated part to the laminated iron core (body). In addition, the joining herein includes the case of again fitting the half-blanked or once separated portion, the so-called push-back, and has only to have a certain coupling force by which separation does not occur during handling. Also, the laminated iron core or the composite laminated iron core is preferably annealed before being placed on the jig. The laminated iron core bonded by the resin cannot be annealed, but in the case of the laminated iron core temporarily bonded by a bond part (caulking or welding) without being influenced by annealing, conveyance is also facilitated and production efficiency is high, and the plural laminated iron cores (or composite laminated iron cores) can be annealed.

Also, in the method for manufacturing the laminated iron core according to the first or the second aspect of the present invention, the jig is preferably a conveyance jig having a placement table and a guide member erected on the placement table. By using this conveyance jig, the laminated iron core or the composite laminated iron core can be conveyed easily.

In the method for manufacturing the laminated iron core according to the first or the second aspect of the present invention, the laminated iron core may be formed of a unit block iron core. Here, a plurality of unit block iron cores may be laminated to form one composite laminated iron core. Accordingly, the unit block iron core can be rotated and laminated outside a die unit rather than being rotated and laminated inside the die unit, with the result that a structure of a die unit is simplified and a manufacturing cost is reduced. Further, conveyance is facilitated since the weight per unit block iron core is reduced.

Also, the unit block iron core may be formed so as to have a divided core with an annular laminated iron core divided in a circumferential direction, and the dummy laminated part connected to the divided core. Accordingly, many iron core pieces can be obtained from a strip-shaped material, and a scrap portion of the material can be reduced. In the method for manufacturing the laminated iron core according to the first or the second aspect of the present invention, the composite laminated iron core may include a stator laminated iron core and the dummy laminated part, and the dummy laminated part may be formed on a radial inside of the stator laminated iron core, a radial outside of the stator laminated iron core, or inside space located between adjacent magnetic pole parts. In the method for manufacturing the laminated iron core according to the first or the second aspect of the present invention, the composite laminated iron core may include a rotor laminated iron core and the dummy laminated part, and the dummy laminated part may be formed on a radial inside of the rotor laminated iron core, a radial outside of the rotor laminated iron core, or inside a through hole formed in the rotor laminated iron core. The through hole includes, for example, a magnet-insert hole for inserting and fixing a permanent magnet, a hole for reducing the weight of a rotor, and a hole for passing through a cooling medium and cooling the rotor laminated iron core.

Advantageous Effects of Invention

In the method for manufacturing the laminated iron core according to the present invention, the enlarged iron core pieces including the dummy piece parts are aligned and laminated and the composite laminated iron core is formed and the dummy laminated part is removed and then, the laminated iron core is bonded. As a result, at the time of conveyance, the dummy piece parts can be gripped rather than the iron core pieces, and the iron core pieces can be prevented from being deformed during the conveyance. Also, the enlarged iron core pieces are temporarily bonded by the dummy piece parts and the one composite laminated iron core is formed and thereby, it becomes easy to handle the composite laminated iron core, and workability is also improved. The dummy laminated part is removed and then, the laminated iron core is bonded, with the result that the laminated iron core (body part) is resistant to being influenced by a warp or a strain due to stress caused at the time of bonding the dummy piece parts. Further, before or after the dummy laminated part is removed, the composite laminated iron core or the laminated iron core is placed on the jig and is positioned and the iron core pieces are mutually bonded (for example, the resin bond part is filled with the resin), with the result that accuracy of the completed laminated iron core is increased.

Here, when the composite laminated iron core with the dummy laminated part attached is placed on the jig, workability of subsequent processing is improved. Also, when the laminated iron core with the dummy laminated part removed is placed on the jig, an influence by caulking is eliminated.

DESCRIPTION OF EMBODIMENTS

Figure 1:
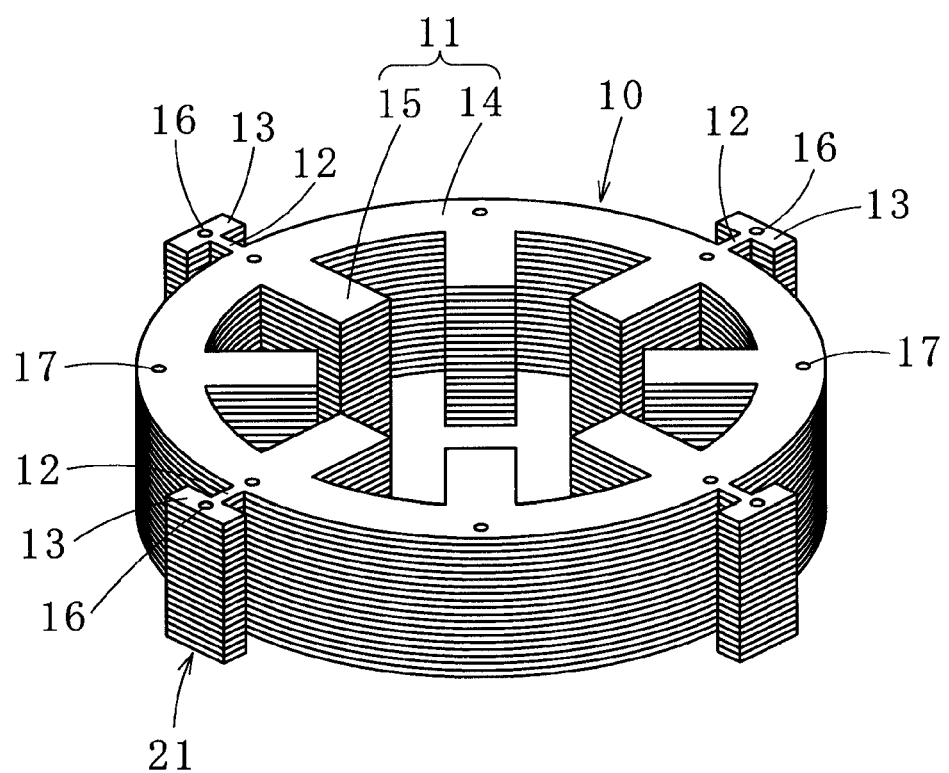
FIG. 1 is an explanatory diagram of a method for manufacturing a laminated iron core according to a first embodiment of the present invention.

Subsequently, embodiments of the present invention will be described with reference to the accompanying drawings.

A manufacturing method of the present embodiment has a step of blanking and forming enlarged iron core pieces 10 including iron core pieces 11 and dummy piece parts 13, a step of aligning and laminating the plural obtained enlarged iron core pieces 10 and forming a composite laminated iron core 18 integrally including the dummy laminated part 21 with the dummy piece parts 13 laminated and a laminated iron core 19 with the iron core pieces 11 laminated, a step of removing the dummy laminated part 21 from the composite laminated iron core 18 and then placing the remaining laminated iron core 19 on a jig and positioning the remaining laminated iron core 19, or a step of placing the composite laminated iron core 18 on a jig and positioning the composite laminated iron core 18 and then removing the dummy laminated part 21 from the composite laminated iron core 18, and a step of mutually bonding each of the iron core pieces 11 of the laminated iron core 19 with the dummy laminated part 21 removed.

Figure 2:
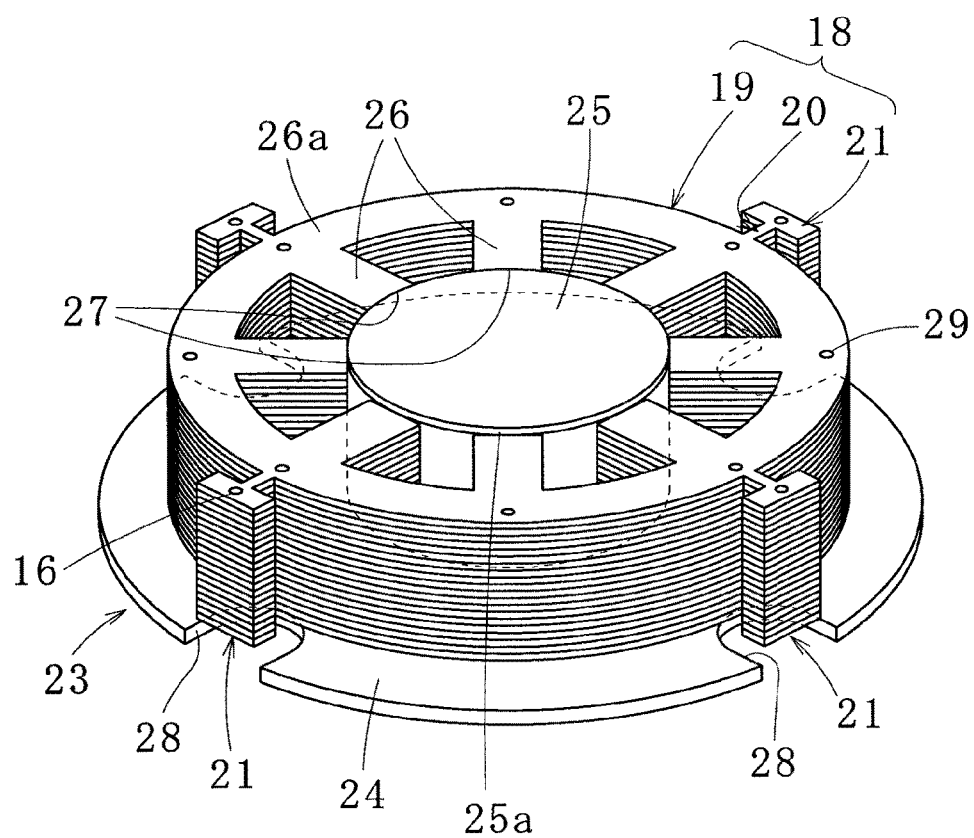
FIG. 2 is an explanatory diagram of the method for manufacturing the laminated iron core.

Next, a manufacturing method according to a first embodiment of the present invention will be described in detail. As shown in FIGS. 1 and 2, a method for manufacturing a laminated iron core according to the first embodiment of the present invention is a method for laminating the blanked and formed iron core pieces 11 and bonding each of the iron core pieces 11 by a resin and manufacturing the laminated iron core 19.

First, the enlarged iron core piece 10 is blanked and formed by a die unit (not shown). This enlarged iron core piece 10 has the iron core piece 11, and the dummy piece parts 13 joined to this iron core piece 11 through joining piece parts 12. Also, the iron core piece 11 has an annular yoke piece part 14, and plural magnetic pole piece parts 15 formed inside the yoke piece part 14. In the following embodiment, the case of temporarily bonding the dummy piece parts will be described, but there are cases where the enlarged iron core pieces are simply aligned and laminated and the composite laminated iron core is formed.

Next, the plural enlarged iron core pieces 10 are laminated and the composite laminated iron core 18 is formed.

In addition, in the following explanation, a laminated body formed by laminating the enlarged iron core pieces 10 including the iron core pieces 11 and the dummy piece parts 13 is called the composite laminated iron core 18. A site which is a part of the composite laminated iron core 18 and is formed by the laminated body made of only the iron core pieces 11 is called the laminated iron core 19.

A center position of each of the dummy piece parts 13 is formed with caulking 16 such as half blank caulking or V caulking, and the yoke piece part 14 is formed with plural resin holes 17 equiangularly in a circumferential direction. The composite laminated iron core 18 is constructed by laminating and joining (temporarily bonding) the plural enlarged iron core pieces 10 through the caulking 16.

The composite laminated iron core 18 has the laminated iron core 19 used as a product body, and the dummy laminated part 21 joined to the laminated iron core 19 through a joining part 20 in the radial outside. That is, the enlarged iron core pieces 10 are bonded by only the dummy piece parts 13, and the mutual iron core pieces 11 are not bonded and are only laminated. In addition, the laminated iron core 19 is formed by laminating the iron core pieces 11, and the joining part 20 is formed by laminating the joining piece parts 12, and the dummy laminated part 21 is formed by aligning and laminating the dummy piece parts 13. In addition, a site which is a part of the laminated iron core 19, the site in which the magnetic pole piece parts 15 are laminated, is called a magnetic pole part 26.

Next, as shown in FIG. 2, the composite laminated iron core 18 constructed by joining the vertically adjacent enlarged iron core pieces 10 by the caulking 16 is placed on a conveyance jig (one example of a jig) 23. The conveyance jig 23 has a placement table 24 with substantially a circular plate shape, and a core member 25 which is one example of a guide member formed in the center of the placement table 24.

Figure 3:
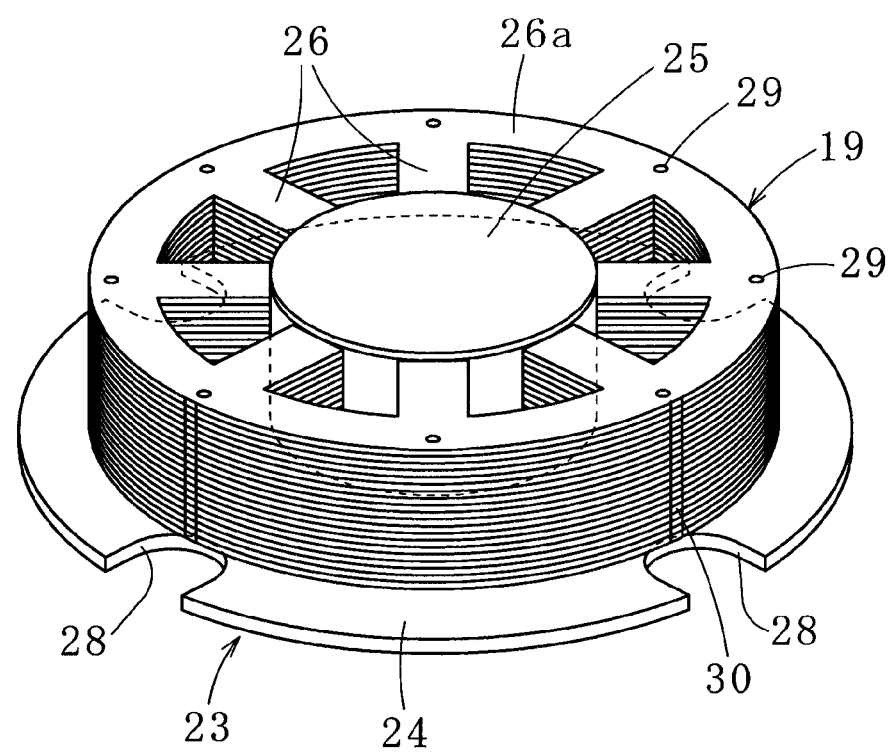
FIG. 3 is an explanatory diagram of the method for manufacturing the laminated iron core.

In the embodiment, the core member 25 is a columnar site. The circumferential edge of an upper surface of the core member 25 is formed with a chamfer 25a. The core member 25 may be formed in a polygonal columnar shape. An outer peripheral surface of the core member 25 can abut on an inside end 27 of the magnetic pole part 26 of the laminated iron core 19. Accordingly, the shaft center of the composite laminated iron core 18 and the laminated iron core 19 can be positioned as shown in FIGS. 2 and 3. Here, 26a shows a yoke part in which the yoke piece parts 14 are laminated. Also, instead of the core member, a positioning member may be used.

And, the positioning member (not shown) for stopping rotation of the composite laminated iron core 18 (and the laminated iron core 19) and the placement table 24 is formed on the placement table 24. The positioning member is present between the adjacent magnetic pole parts 26 of the composite laminated iron core 18, and stops the rotation by abutting on the magnetic pole part 26. A pair of the positioning members is arranged as opposed to each other.

Also, a notch 28 to which the dummy laminated part 21 and the joining part 20 are loosely fitted is formed in a position just under the dummy laminated part 21 of the composite laminated iron core 18 in the periphery of the placement table 24. A resin bond part 29 with a circular cross section in which the resin hole 17 is vertically joined is formed by positioning the enlarged iron core pieces 10 using the core member 25 and laminating the enlarged iron core pieces 10. In addition, in this step, the inside of the resin bond part 29 is not filled with a resin. In addition, when the dummy laminated part 21 is formed on the portion other than the radial outside of the laminated iron core 19 (for example, the inside of a slot which is space located between the adjacent magnetic pole parts 26), the placement table 24 may be provided with a through hole.

Next, as shown in FIG. 3, the joining part 20 is separated from the laminated iron core 19 in a position of the joining part 20, accurately, in the radial inside of the joining part 20. Accordingly, each of the iron core pieces 11 constrained by the dummy laminated parts 21 is released, and the iron core pieces 11 are aligned along the core member 25 to form the laminated iron core 19 with higher accuracy. In addition, numeral 30 in FIG. 3 shows a separation mark of the joining part 20.

Figure 4:
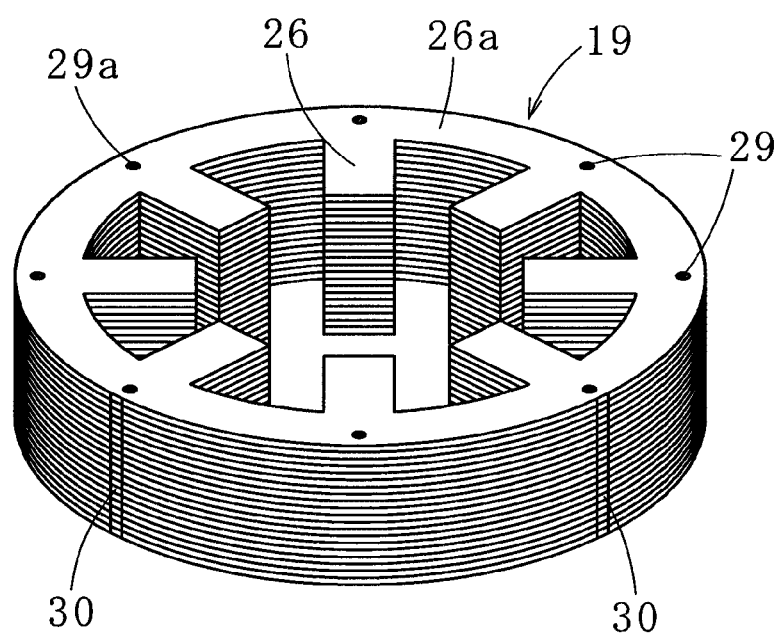
FIG. 4 is a perspective view of the laminated iron core manufactured by the method for manufacturing the laminated iron core.

Then, as shown in FIG. 4, the resin bond part 29 is filled with a resin 29a, and each of the iron core pieces 11 is joined in a vertical direction. Since the product of a cross-sectional area S of the resin bond part 29 and the number n of resin bond parts 29 is proportional to a bonding strength of the iron core pieces 11, the product is set at a proper value in consideration of a strength of the resin 29a.

Figure 5:
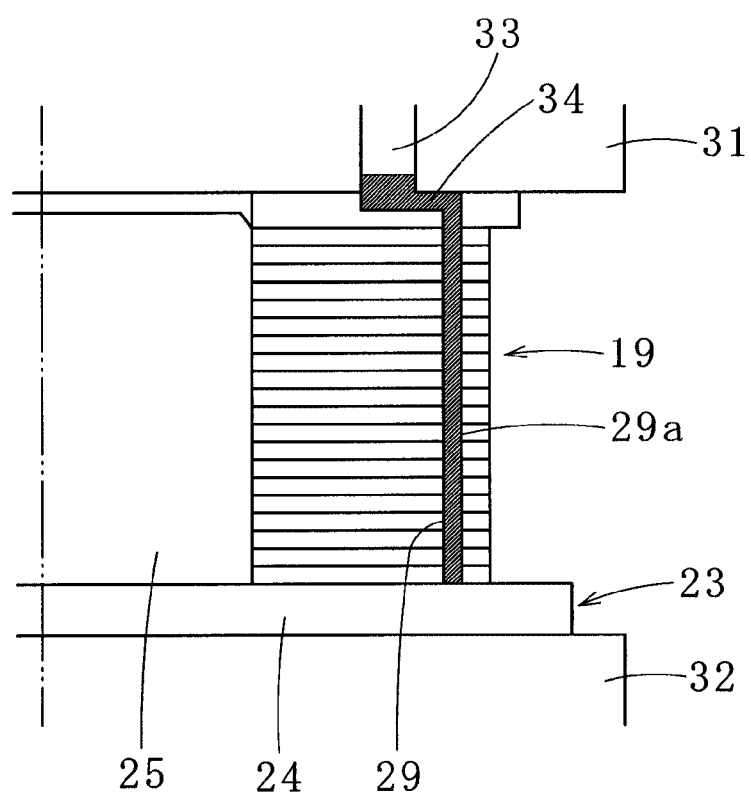
FIG. 5 is an explanatory diagram particularly showing a step of resin bonding in the method for manufacturing the laminated iron core.

Here, in the case of resin sealing (resin bonding) of the laminated iron core 19, for example, as shown in FIG. 5, the laminated iron core 19 with the laminated iron core 19 placed on the conveyance jig 23 is conveyed between an upper die 31 and a lower die 32, and the laminated iron core 19 is held by the upper die 31 and the lower die 32 therebetween. Then, the resin 29a is extruded from a resin pool pot 33 formed in the upper die 31, and the resin bond part 29 is filled with the resin 29a through a runner 34. In addition, the resin bond part 29 can be filled with the resin 29a from the lower die 32. The resin 29a may be a thermosetting resin (for example, an epoxy resin) or a thermoplastic resin.

Figure 6:
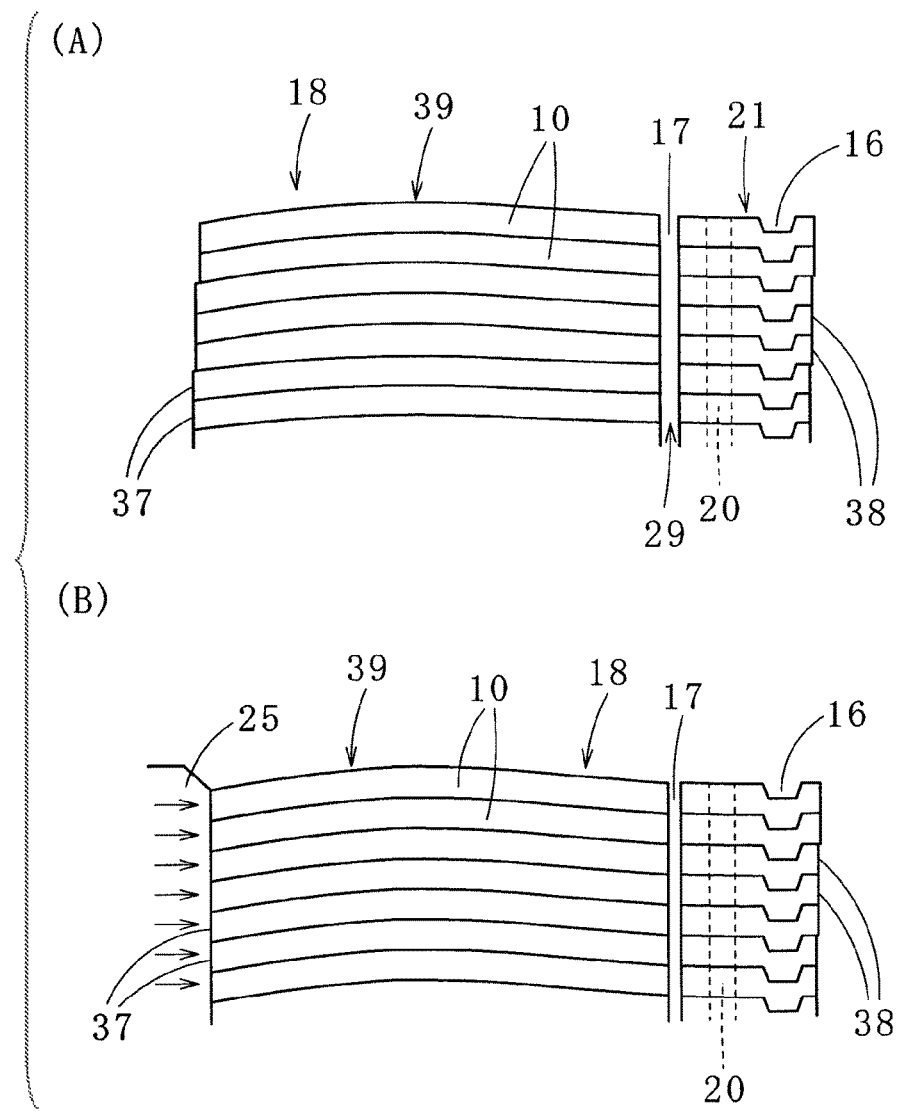
In FIG. 6, (A) is a partially sectional view of a composite laminated iron core in a state in which a guide member is not inserted into a shaft center, and (B) is a partially sectional view of the composite laminated iron core in a state in which the guide member is inserted into the shaft center.

Subsequently, action and effect of the method for manufacturing the laminated iron core according to the embodiment will be described in further detail with reference to FIGS. 6(A) and 6(B), FIGS. 7(C) and 7(D) and FIGS. 8(E) and 8(F). At a point in time when the enlarged iron core pieces 10 are manufactured by the die unit and are laminated by the caulking 16, as shown in FIG. 6(A), a position of each caulking 16 is aligned in one straight line extending in the vertical direction, but positions of an inside end 37 and an outside end 38 of each enlarged iron core piece 10 forming the composite laminated iron core 18 are not aligned. Also, a warp 39 occurs on a surface of the enlarged iron core piece 10.

Then, as shown in FIG. 6(B), when the core member 25 for positioning is inserted to perform positioning, the inside end 37 of each enlarged iron core piece 10 is aligned, but the outside of the enlarged iron core piece 10 is constrained by the caulking 16, with the result that the warp 39 on the surface of the enlarged iron core piece 10 is increased.

Figure 7:
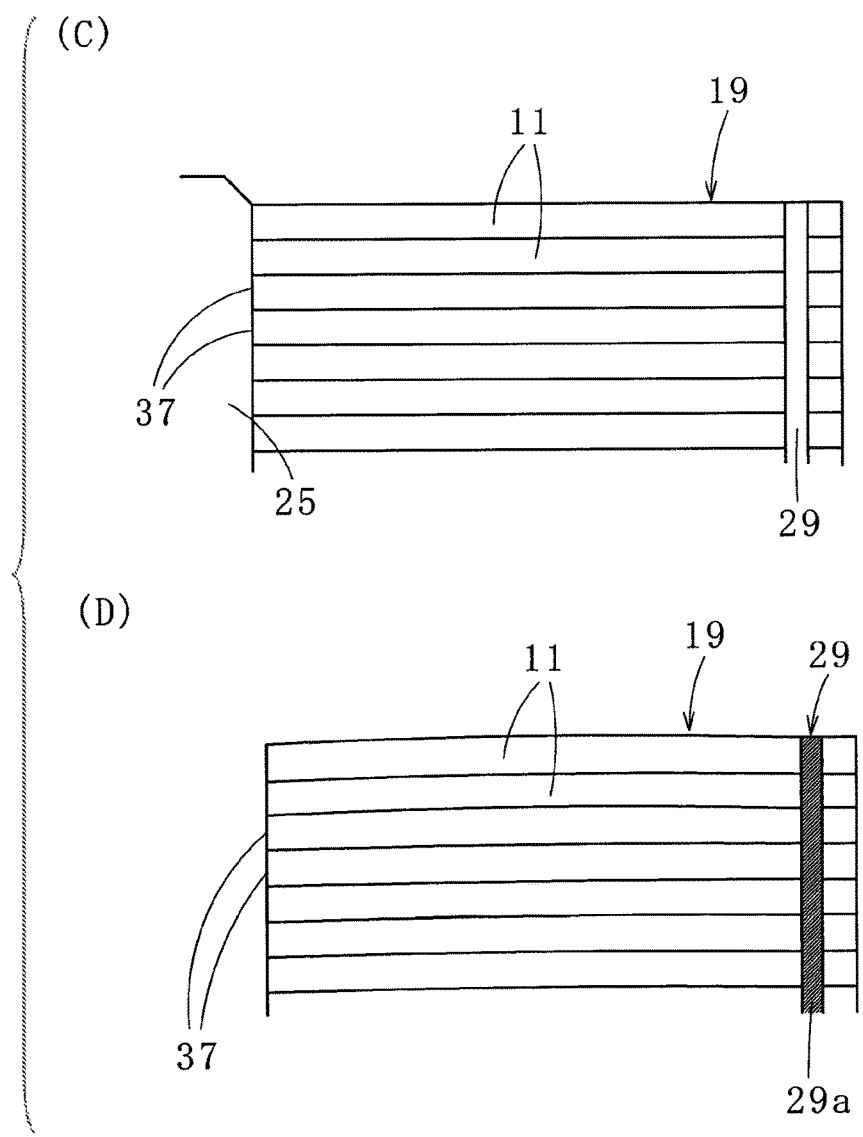
In FIG. 7, (C) is a partially sectional view of the laminated iron core in a state in which the guide member is inserted into the shaft center and a dummy laminated part is removed, and (D) is a partially sectional view of the laminated iron core in a state in which a resin bond part is further filled with a resin.

Then, as shown in FIG. 7(C), when the dummy laminated part 21 is cut off at a base of the joining part 20, the enlarged iron core piece 10 is released from constraint by the caulking 16, and the warp occurring by the constraint is reduced. In this state, the resin bond part 29 is filled with the resin 29a as shown in FIG. 7(D). Accordingly, each of the iron core pieces 11 is fastened to complete the laminated iron core 19.

Figure 8:
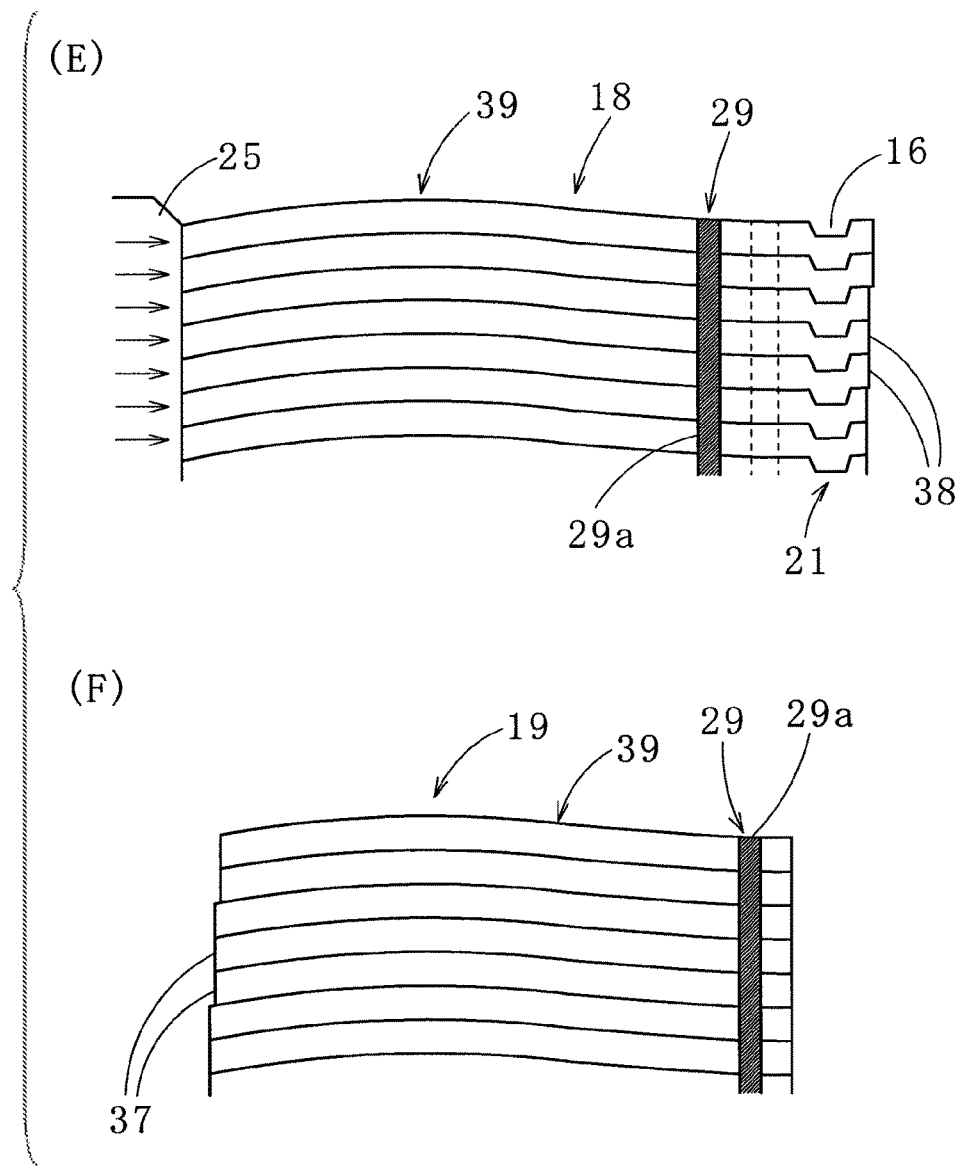
In FIG. 8, (E) is a partially sectional view of the composite laminated iron core in a state in which the guide member is inserted into the shaft center and the dummy laminated part is not removed, and (F) is a partially sectional view of a state in which the dummy laminated part of the composite laminated iron core is removed.

However, unlike the embodiment described above, as shown in FIG. 8(E), when the dummy laminated part 21 of the composite laminated iron core 18 is not removed and the core member 25 is inserted into the center of the composite laminated iron core 18 to position the composite laminated iron core 18 and the resin bond part 29 is filled with the resin 29a as it is and each of the enlarged iron core pieces 10 is fixed, the outside of the composite laminated iron core 18 is constrained by the dummy laminated parts 21. As a result, as shown in FIG. 8(F), even when the dummy laminated part 21 is removed, the iron core pieces 11 forming the laminated iron core 19 are bonded by the resin 29a of the resin bond part 29 with the iron core pieces 11 constrained by the caulking 16, and the warps 39 remain and unevenness of the inside ends 37 is not solved. Consequently, the laminated iron core with bad straightness and low dimension accuracy is formed. However, the manufacturing method according to the embodiment solves these problems.

In the embodiment described above, after the composite laminated iron core 18 is placed on the conveyance jig 23, the dummy laminated part 21 is removed and the resin bonding is performed, but after the dummy laminated part 21 of the composite laminated iron core 18 is separated at the joining part 20, the remaining laminated iron core 19 can also be placed on the conveyance jig 23. In this case, the placement table 24 of the conveyance jig 23 is provided with a positioning member (guide member) for maintaining each of the iron core pieces 11 at a predetermined angle. Accordingly, the straightness of the iron core pieces 11 positioned and stacked is ensured and the warp does not occur on the surface, with the result that the resin bond part 29 can be filled with the resin 29a with the iron core pieces 11 pinched by the upper die 31 and the lower die 32 (the same applies to the following embodiments).

Next, the joining piece parts 12 and the joining part 20 for joining the dummy laminated part 21 to the laminated iron core 19 will be described using FIGS. 9(A) to 9(D). In addition, these modified examples can be applied to not only the embodiment described above but also the following embodiments. In the composite laminated iron core 18 used by the method for manufacturing the laminated iron core according to the first embodiment, the joining part 20 has a simple rectangular shape in plan view, but like a first example shown in FIG. 9(A), a narrow part 42 may be formed in a cut position of the joining part 20 (joining piece part 12). Accordingly, the joining part 20 can easily be cut and its cut position is also determined.

Figure 9:
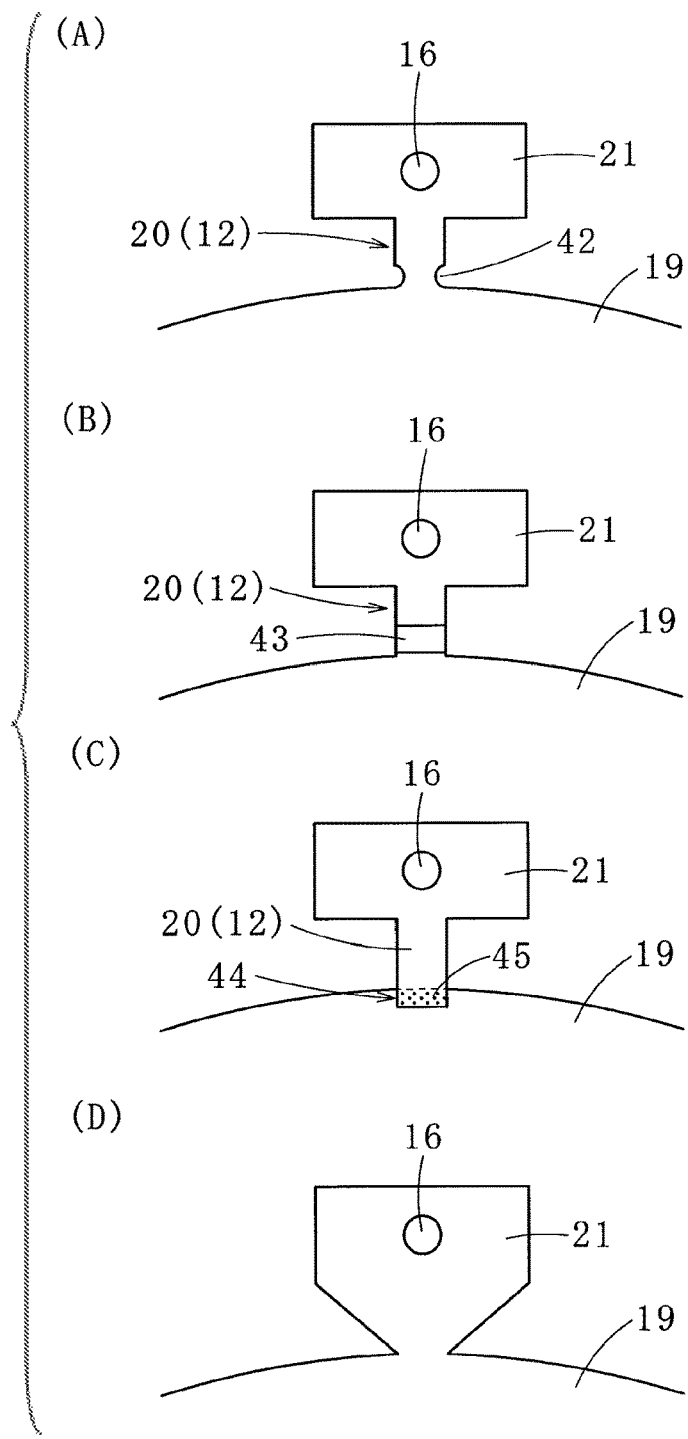
In FIG. 9, (A) to (D) are explanatory diagrams of joining parts according to first to fourth examples, respectively.

FIG. 9(B) illustrates a shape of the joining part 20 (joining piece part 12) according to a second example. A base of the joining part 20 (accurately, a base of each of the joining piece parts 12) is formed with a thin-walled part 43. This thin-walled part 43 is formed by coining processing. Accordingly, the dummy laminated part 21 can be removed (cut) at the thin-walled part 43, and division processing can be performed more easily.

FIG. 9(C) shows the joining part 20 (joining piece part 12) according to a third example. A base 44 of the joining piece part 12 is provided with a push-back part 45 fitted into the iron core piece 11. This push-back part 45 is formed by half punching the base 44 of the joining piece part 12 in a U shape and forming a state in which the base 44 of the joining piece part 12 is partially joined to the iron core piece 11 and then flashing the base 44 and the periphery of the base 44 from upward and downward sides and matching levels of the iron core piece 11 of the base 44 and the periphery of the base 44. In the formation of the push-back part 45, the joining piece part 12 may be pushed back and again fitted after the joining piece part 12 is completely separated once. In the shape of the push-back part 45, various shapes such as a taper or an inverted taper can be applied.

The dummy laminated part 21 is separated from the laminated iron core 19 by applying a low load to the push-back part 45. In addition, like a fourth example shown in FIG. 9(D), the dummy piece part 13 may be directly joined to the iron core piece 11 without forming the joining piece part 12. In addition, the shape of the joining part is not limited, and includes a shape in which the dummy piece part 13 is pushed back in the iron core piece 11.

In the method for manufacturing the laminated iron core according to the embodiment described above, the composite laminated iron core 18 (or the laminated iron core 19) laminated and formed after being blanked and formed is preferably annealed before resin sealing before or after the composite laminated iron core 18 is placed on the conveyance jig 23. Accordingly, a residual stress accumulated internally can be eliminated (the same applies to the following embodiments).

Figure 10:
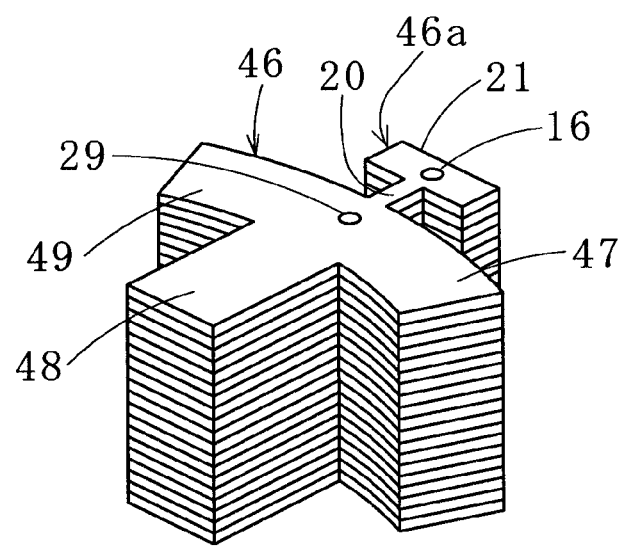
FIG. 10 is an explanatory diagram of a method for manufacturing a laminated iron core according to a second embodiment of the present invention.

FIG. 10 shows a method for manufacturing a laminated iron core according to a second embodiment of the present invention. A divided core 46 (one example of the laminated iron core) is formed by removing a dummy laminated part 21 from a unit block iron core 46*a*. This unit block iron core 46*a* is formed in a shape in which the composite laminated iron core 18 shown in FIG. 1 is divided in a circumferential direction. This unit block iron core 46*a* has a divided yoke part 47, a magnetic pole part 48 formed inside the divided yoke part 47, and the dummy laminated part 21 bonded to the outside of the divided yoke part 47 through a joining part 20. A stator laminated iron core used for one motor etc. is formed by annularly arranging a predetermined number of divided cores 46 and forming an annular laminated iron core.

In the case of positioning this unit block iron core 46*a*, preferably, a predetermined number of unit block iron cores 46*a* respectively having the dummy laminated parts 21 are annularly arranged and are positioned on a conveyance jig 23 in the same manner as that of the composite laminated iron core 18 according to the first embodiment. In this case, the conveyance jig 23 is preferably provided with a positioning member for positioning the outsides of the divided yoke parts 47 of the unit block iron cores 46*a* annularly arranged.

After the dummy laminated parts 21 are removed from the plural unit block iron cores 46*a* positioned on the conveyance jig 23 and each divided iron core piece 49 is put in a free state, a resin bond part 29 is filled with a resin and each divided iron core piece 49 is fixed and the divided core 46 is completed.

Figure 11:
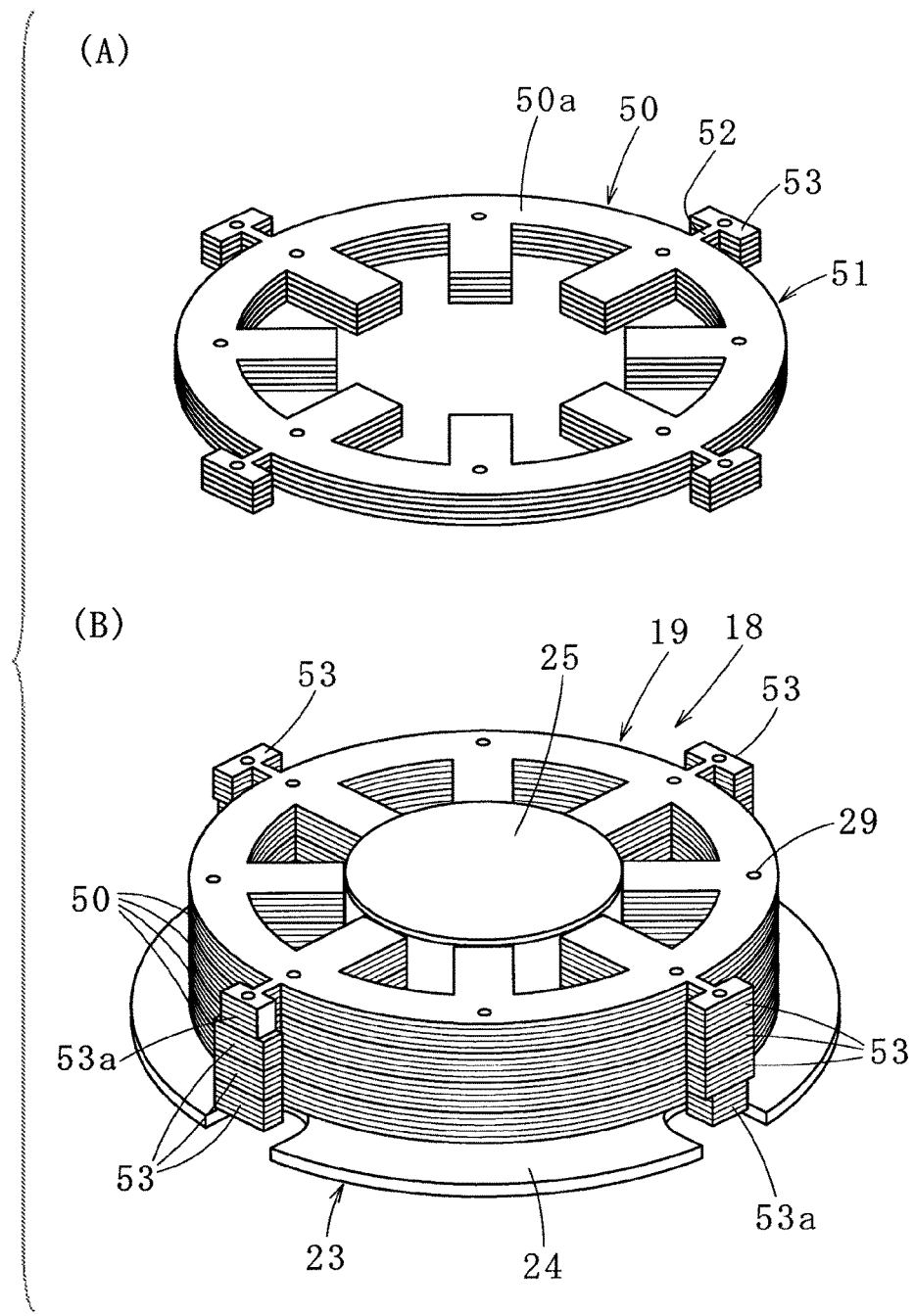
In FIG. 11, (A) and (B) are explanatory diagrams of a method for manufacturing a laminated iron core according to a third embodiment of the present invention.

Subsequently, a method for manufacturing a laminated iron core according to a third embodiment of the present invention will be described with reference to FIGS. 11(A) and 11(B). In this embodiment, plural unit block iron cores 50 are manufactured and the plural unit block iron cores 50 are stacked to form one composite laminated iron core 18. The unit block iron core 50 is formed by laminating unit block iron core pieces 50*a*, and has a laminated iron core body 51, a unit joining part 52 formed on the periphery of the laminated iron core body 51, and a unit dummy laminated part 53. The manufacturing method of this unit block iron core 50 is similar to that of the composite laminated iron core 18, and it becomes easy to carry the unit block iron core 50 around since the whole thickness of the unit block iron core 50 is thin.

This unit block iron core 50 has the four unit dummy laminated parts 53 spaced 90 degrees apart. One (hereinafter called 53*a*) of the unit dummy laminated parts 53 has a shape (for example, a different size) different from that of the other unit dummy laminated parts 53 and thereby, an angular position of blanking from a thin metal sheet is found. Consequently, the unit block iron cores 50 can be rotated and laminated while checking a position of the unit dummy laminated part 53*a* with the different shape in the case of stacking the plural unit block iron cores 50 as shown in FIG. 11(B).

In this state, the laminated unit block iron cores 50 (composite laminated iron core 18) are first installed on a conveyance jig 23, and the laminated unit dummy laminated parts 53, 53*a* are removed, and the laminated unit block iron cores 50 are positioned between an upper die and a lower die and are held by the upper die and the lower die therebetween, and a resin bond part 29 is filled with a resin. Accordingly, a laminated iron core 19 with a more uniform height is formed.

Figure 12:
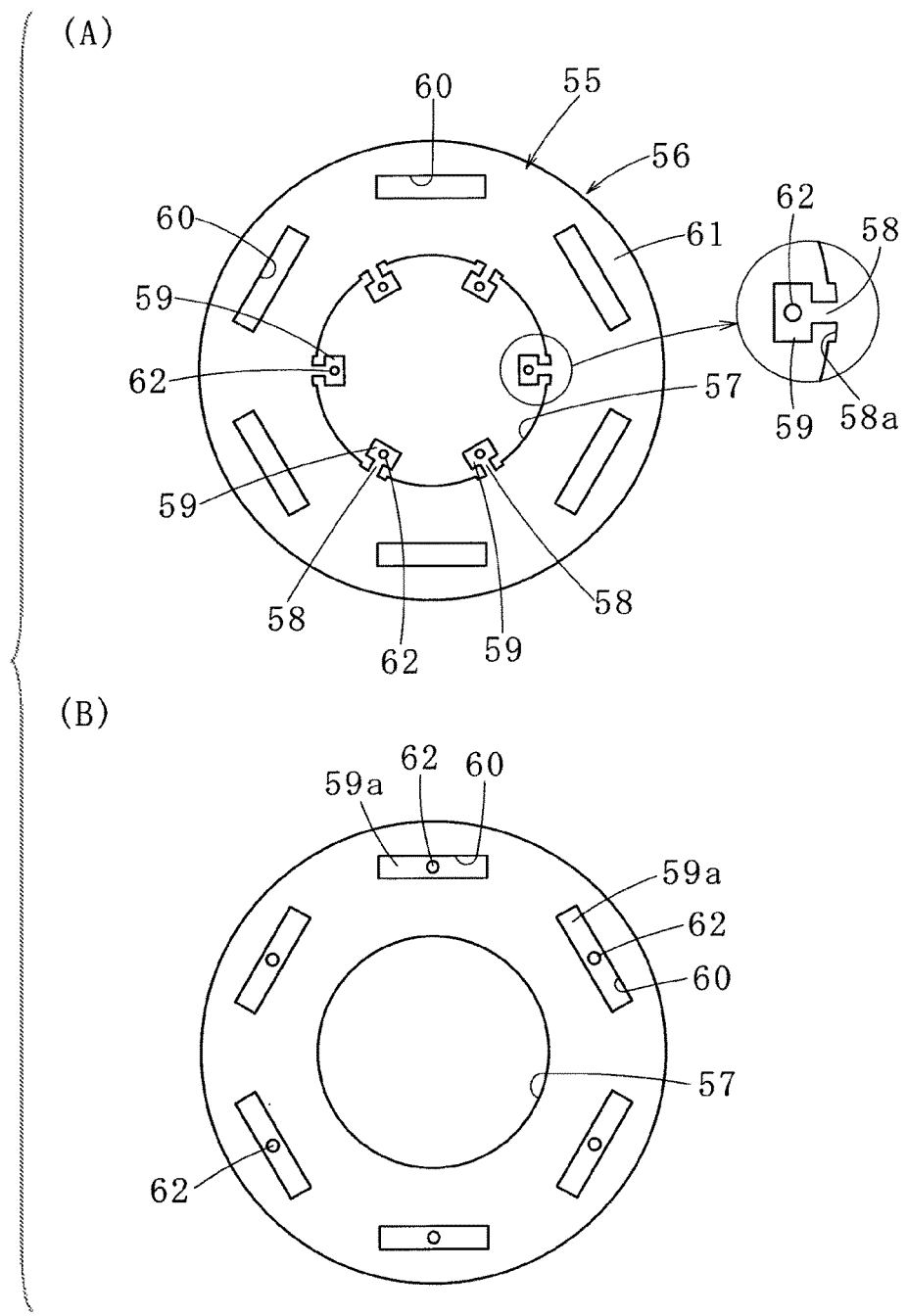
In FIG. 12, (A) and (B) are explanatory diagrams of methods for manufacturing laminated iron cores according to fourth and fifth embodiments of the present invention, respectively.
Figure 13:
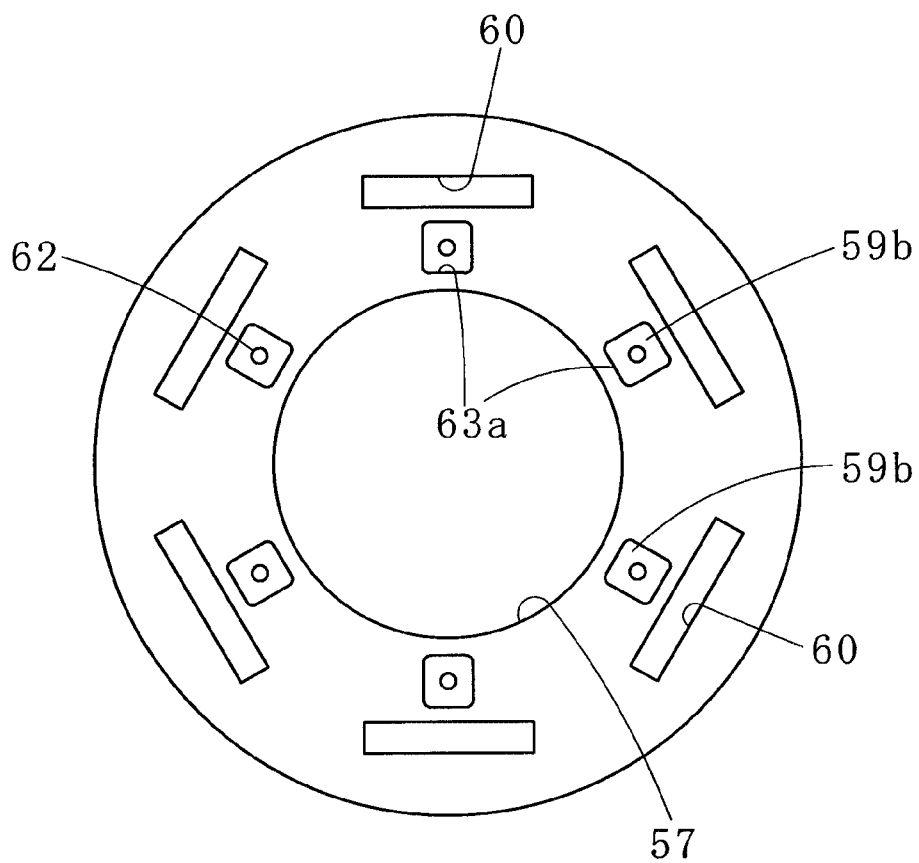
FIG. 13 is a plan view of a laminated iron core manufactured by a method for manufacturing the laminated iron core according to a sixth embodiment of the present invention.

Next, methods for manufacturing laminated iron cores according to fourth to sixth embodiments of the present invention will be described with reference to FIGS. 12(A), 12(B) and 13. As shown in FIG. 12(A), in a composite laminated iron core 56, plural dummy laminated parts 59 are axisymmetrically formed on a shaft hole 57 (that is, a radial inside of a rotor laminated iron core 55) formed in the center of the rotor laminated iron core (body) 55 through joining parts 58. In addition, the dummy laminated parts may be formed on a radial outside of the rotor laminated iron core 55.

Further, as shown in FIG. 12(B), a dummy laminated part 59*a* may be formed inside a magnet-insert hole (one example of a through hole) 60. Also, as shown in FIG. 13, a dummy laminated part 59*b* may be formed in a through hole 63*a* for weight reduction (or for cooling). Here, the dummy laminated parts 59*a*, 59*b* are set at the same size as those of the magnet-insert hole 60 and the through hole 63*a*, respectively, but the dummy laminated part may be set at a size smaller than that of the magnet-insert hole 60 or the through hole 63*a*. There are cases where the dummy laminated parts 59, 59*a*, 59*b* are laminated or not laminated by caulking, and the present invention is applied to all of the dummy laminated parts.

The rotor laminated iron core 55 shown in FIG. 12(A) includes plural magnet-insert holes 60 in a region of the radial outside. Since a permanent magnet is inserted into this magnet-insert hole 60 and the magnet-insert hole 60 is filled with a resin, the magnet-insert hole 60 functions as a resin bond part. Consequently, enlarged iron core pieces 61 forming the composite laminated iron core 56 are blanked and formed from a thin metal sheet (magnetic steel plate), and the enlarged iron core pieces 61 are caulked and laminated through caulking 62 formed in the center of the dummy laminated part 59, and the composite laminated iron core 56 is formed. In addition, in the case of lacking strength as the resin bond part by only the magnet-insert hole 60, or the case of wanting to bond in the portion other than a region formed with the magnet-insert hole 60, a through hole may be separately formed and be filled with a resin.

Next, this composite laminated iron core 56 is placed on a conveyance jig. The conveyance jig has a placement table and a guide member (positioning member). The positioning member positions the shaft hole 57 or plural places of a radial outside end of the composite laminated iron core 56, and the composite laminated iron core 56 is fixed and arranged on the placement table. Then, after a predetermined permanent magnet (non-magnetization) is inserted into the magnet-insert hole 60, the composite laminated iron core 56 is positioned and arranged between a lower die and an upper die and is pressed, and the magnet-insert hole 60 is filled with a resin.

In addition, the dummy laminated part 59 is removed before or after the permanent magnet is inserted into the magnet-insert hole 60. Accordingly, each of the iron core pieces constructing the rotor laminated iron core 55 becomes free, and a position of each of the iron core pieces is determined by the positioning member. This increases straightness of the rotor laminated iron core 55. When the magnet-insert holes 60 are filled with the resins, the iron core pieces constructing the rotor laminated iron core 55 are fixed. Also, as shown in FIG. 12(A), the portion of connection between the rotor laminated iron core 55 (iron core piece body) and the joining part 58 (joining piece part) of the dummy laminated part 59 (dummy piece part) can also be formed with a groove part 58a to thereby remove the dummy laminated part 59 easily.

Figure 14:
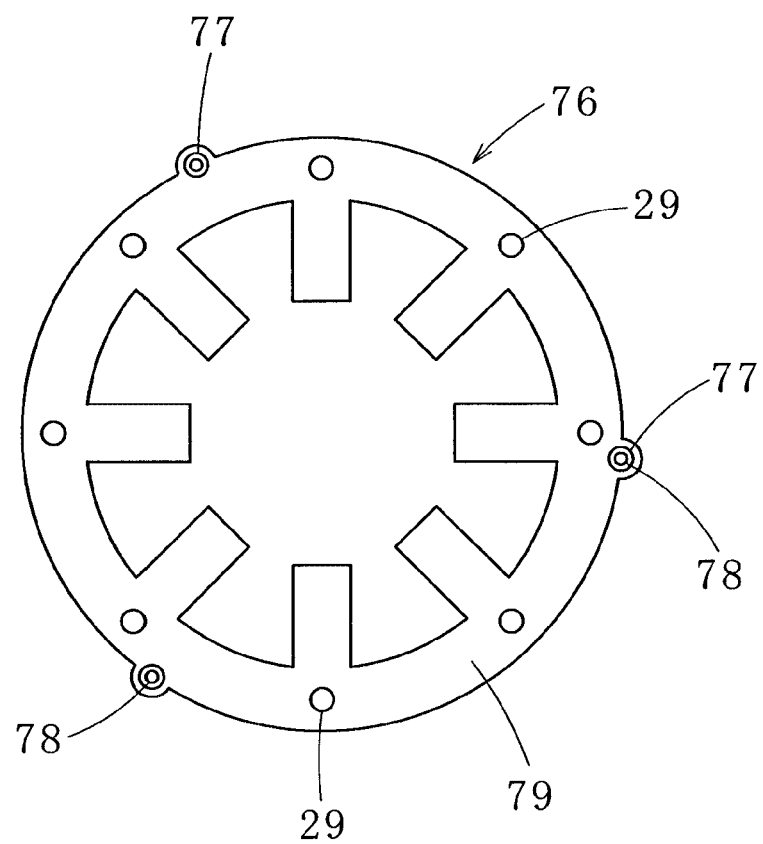
FIG. 14 is an explanatory diagram of a method for manufacturing a laminated iron core according to a seventh embodiment of the present invention.

FIG. 14 shows a composite laminated iron core 76 manufactured by a method for manufacturing a laminated iron core according to a seventh embodiment of the present invention. This composite laminated iron core 76 has a stator laminated iron core, and the periphery of the composite laminated iron core 76 is provided with a through hole 77 for fixing to a case etc. of an electric motor by a bolt etc. A half-punched dummy piece part for closing this through hole 77 is provided with caulking 78, and each iron core piece 79 is temporarily fixed. Also in this embodiment, like the first embodiment, this composite laminated iron core 76 is installed on a conveyance jig 23, and a dummy laminated part made of the dummy piece parts is removed and then, a resin bond part 29 is filled with a resin.

Figure 15:
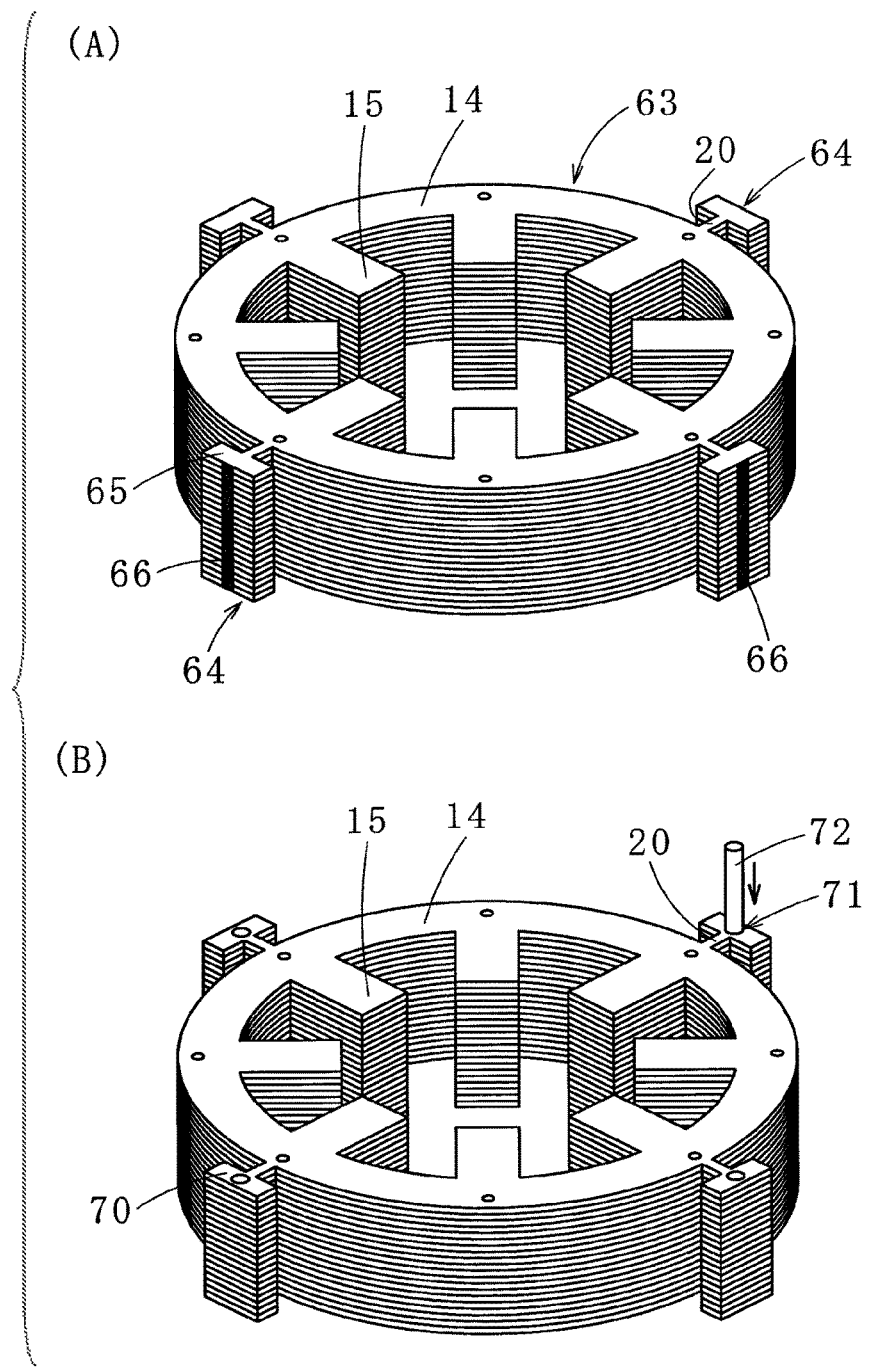
In FIG. 15, (A) and (B) are explanatory diagrams of methods for manufacturing laminated iron cores according to eighth and ninth embodiments of the present invention, respectively.

Subsequently; methods for manufacturing laminated iron cores according to eighth and ninth embodiments of the present invention shown in FIG. 15 will be described. In the method for manufacturing the laminated iron core according to the eighth embodiment shown in FIG. 15(A), welding 66 is used in bonding of each dummy piece part 65 of a dummy laminated part 64 formed on the periphery of a laminated iron core 63 through a joining part 20. This welding 66 is used instead of caulking 16, and the others are omitted since the others are the same as the method for manufacturing the laminated iron core according to the first embodiment. Also, in the method for manufacturing the laminated iron core according to the ninth embodiment shown in FIG. 15(B), a pin 72 is inserted into a through hole 71 bored in each dummy piece part 70 to temporarily bond the dummy piece part 70. Moreover, various bonding methods using an adhesive etc. can be applied to bonding of the dummy piece part.

Figure 16:
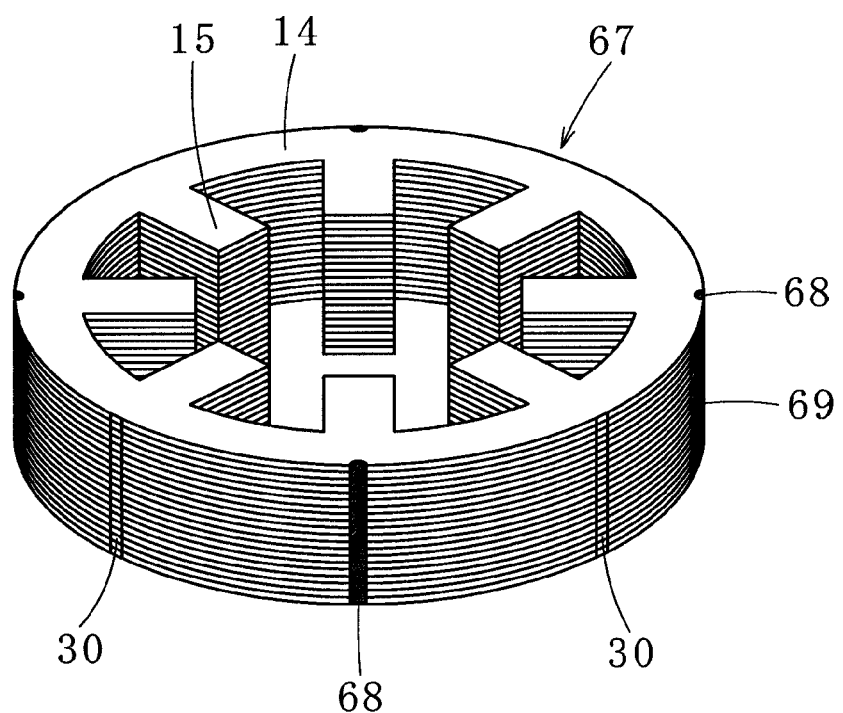
FIG. 16 is a perspective view of a laminated iron core manufactured by a method for manufacturing the laminated iron core according to a tenth embodiment of the present invention.
Figure 17:
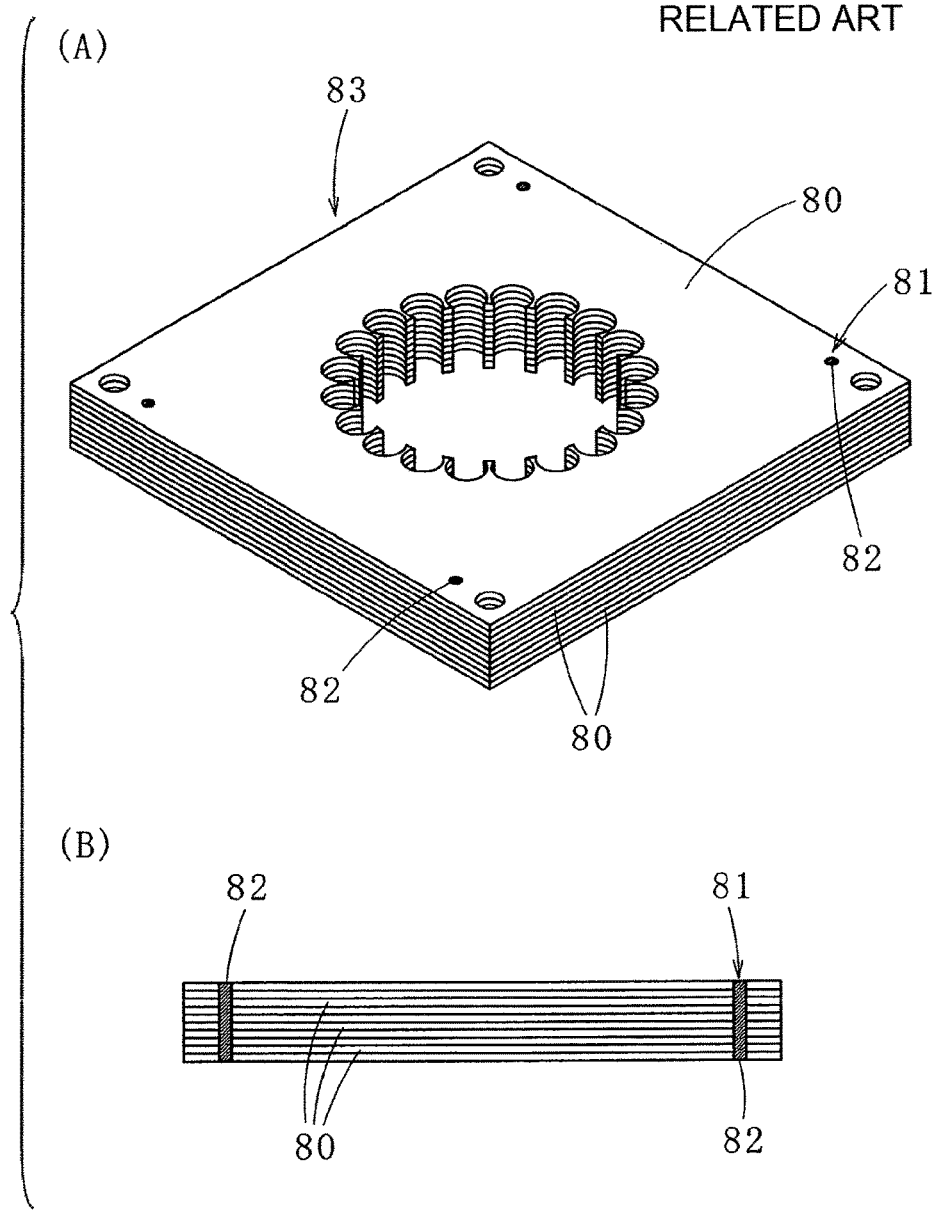
In FIG. 17, (A) and (B) are explanatory diagrams of a method for manufacturing a laminated iron core according to a conventional example, respectively.
Figure 18:
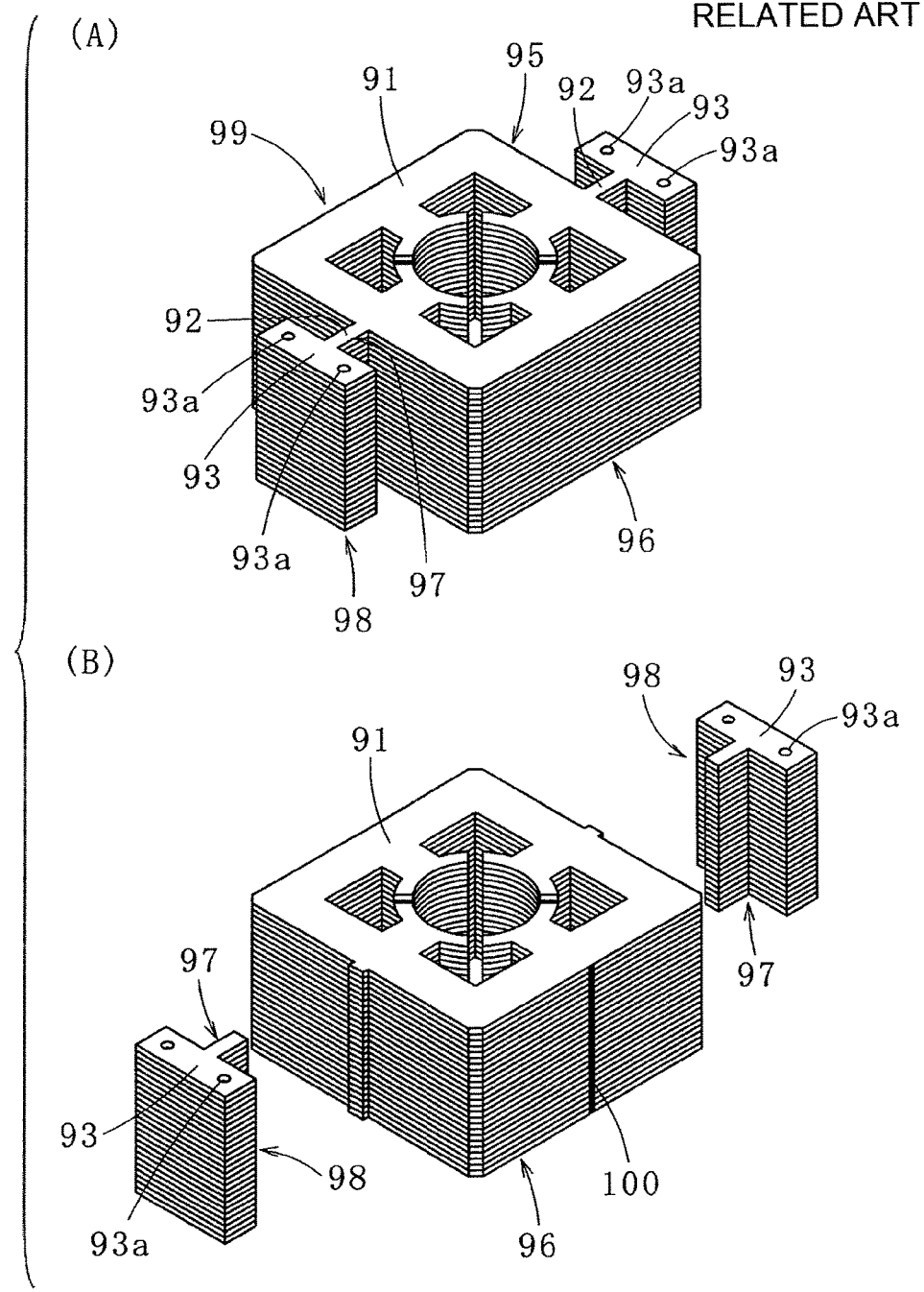
In FIG. 18, (A) and (B) are explanatory diagrams of a method for manufacturing a laminated iron core according to another conventional example, respectively.

A method for manufacturing a laminated iron core according to a tenth embodiment of the present invention will be described with reference to FIG. 16. The manufacture of a laminated iron core 67 is basically similar to that of the first embodiment, but an outer peripheral end 69 of the laminated iron core 67 is formed with resin bond parts 68. At the time of resin sealing, a die unit for surrounding the outsides of the resin bond parts 68 is prepared, and the resin sealing is performed with the resin bond parts 68 set in closed space.

The present invention is not limited to the embodiments described above and, for example, the present invention can also be formed by combining partial modified examples and the first to tenth embodiments. Bonding of the laminated iron core (that is, each of the iron core pieces) is not limited to resin bonding, and welding, adhesion, etc. may be used. A kind of caulking includes V caulking, half punch caulking, etc., but other caulking may be used. A connection position of the dummy piece part in the stator laminated iron core is not particularly limited as long as the connection position is an external shape portion (for example, the radial inside, the radial outside, the inside of the space (slot) between the adjacent magnetic pole parts 26, or the through hole (bolt hole)) of the iron core piece, but the connection position is properly set in consideration of ease of removal of the dummy laminated part, a small influence on motor characteristics, etc.

The present invention has been described in detail with reference to the specific embodiments, but it is apparent to those skilled in the art that various changes or modifications can be made without departing from the spirit and scope of the present invention.

The present application is based on Japanese patent application No. 2014-3486 filed on Jan. 10, 2014 and Japanese patent application No. 2014-245095 filed on Dec. 3, 2014, the contents of which are hereby incorporated by reference.

REFERENCE SIGNS LIST

10: ENLARGED IRON CORE PIECE
11: IRON CORE PIECE
12: JOINING PIECE PART
13: DUMMY PIECE PART
14: YOKE PIECE PART
15: MAGNETIC POLE PIECE PART
16: CAULKING
17: RESIN HOLE
18: COMPOSITE LAMINATED IRON CORE
19: LAMINATED IRON CORE
20: JOINING PART
21: DUMMY LAMINATED PART
23: CONVEYANCE JIG
24: PLACEMENT TABLE
25: CORE MEMBER
25a: CHAMFER
26: MAGNETIC POLE PART
26a: YOKE PART
27: INSIDE END
28: NOTCH
29: RESIN BOND PART
29a: RESIN
30: SEPARATION MARK
31: UPPER DIE
32: LOWER DIE
33: RESIN POOL POT
34: RUNNER
37: INSIDE END
38: OUTSIDE END
39: WARP
42: NARROW PART
43: THIN-WALLED PART
44: BASE
45: PUSH-BACK PART
46: DIVIDED CORE
46a: UNIT BLOCK IRON CORE
47: DIVIDED YOKE PART
48: MAGNETIC POLE PART
49: DIVIDED IRON CORE PIECE
50: UNIT BLOCK IRON CORE

50a: UNIT BLOCK IRON CORE PIECE
51: LAMINATED IRON CORE BODY
52: UNIT JOINING PART
53, 53a: UNIT DUMMY LAMINATED PART
55: ROTOR LAMINATED IRON CORE
56: COMPOSITE LAMINATED IRON CORE
57: SHAFT HOLE
58: JOINING PART
58a: GROOVE PART
59, 59a, 59b: DUMMY LAMINATED PART
60: MAGNET-INSERT HOLE
61: ENLARGED IRON CORE PIECE
62: CAULKING
63: LAMINATED IRON CORE
63a: THROUGH HOLE
64: DUMMY LAMINATED PART
65: DUMMY PIECE PART
66: WELDING
67: LAMINATED IRON CORE
68: RESIN BOND PART
69: OUTER PERIPHERAL END
70: DUMMY PIECE PART
71: THROUGH HOLE
72: PIN
76: COMPOSITE LAMINATED IRON CORE
77: THROUGH HOLE
78: CAULKING
79: IRON CORE PIECE

The invention claimed is:

1. A method for manufacturing a laminated iron core, the method comprising:
  blanking and forming enlarged iron core pieces including iron core pieces and dummy piece parts;
  aligning and laminating the enlarged iron core pieces to form a composite laminated iron core that integrally includes the laminated iron core, formed from a lamination of the iron core pieces, and a dummy laminated part, formed from a lamination of the dummy piece parts, wherein the dummy laminated part is temporarily bonded;
  placing the composite laminated iron core on a jig and positioning the composite laminated iron core;
  removing the dummy laminated part and releasing the enlarged iron core pieces from constraint caused by the temporary bonding of the dummy laminated part, thereby reducing warp occurring in the enlarged iron core pieces as a result of the constraint, and obtaining the laminated iron core; and
  mutually bonding each of the iron core pieces of the laminated iron core after the dummy laminated part is removed.

2. The method for manufacturing the laminated iron core according to claim 1, wherein a resin bond part of the laminated iron core is filled with a resin to mutually bond each of the iron core pieces.

3. The method for manufacturing the laminated iron core according to claim 1, wherein the composite laminated iron core is annealed before being placed on the jig.

4. The method for manufacturing the laminated iron core according to claim 1, wherein the jig is a conveyance jig including a placement table and a guide member erected on the placement table.

5. The method for manufacturing the laminated iron core according to claim 1, wherein the composite laminated iron core is formed of a unit block iron core.

6. The method for manufacturing the laminated iron core according to claim 5, wherein a plurality of unit block iron cores are laminated to form the composite laminated iron core.

7. The method for manufacturing the laminated iron core according to claim 5, wherein the unit block iron core is formed of a divided core that is a segment of an annular laminated iron core divided in a circumferential direction, and
  wherein the dummy laminated part is connected to the divided core.

8. The method for manufacturing the laminated iron core according to claim 1, wherein the composite laminated iron core includes a stator laminated iron core and the dummy laminated part, and
  the dummy laminated part is formed on a radial inside of the stator laminated iron core, a radial outside of the stator laminated iron core, or inside space located between adjacent magnetic pole parts.

9. The method for manufacturing the laminated iron core according to claim 1, wherein the composite laminated iron core includes a rotor laminated iron core and the dummy laminated part, and
  the dummy laminated part is formed on a radial inside of the rotor laminated iron core, a radial outside of the rotor laminated iron core, or inside a through hole formed in the rotor laminated iron core.

10. The method for manufacturing the laminated iron core according to claim 1, further comprising:
  positioning a part of the jig at an inner diameter side of the composite laminated iron core so as to align the composite laminated iron core.

11. The method for manufacturing the laminated iron core according to claim 10, further comprising:
  providing the part of the jig at the inner diameter side as a core member; and
  positioning the core member within inner diameters of the composite laminated iron core at the inner diameter side thereof so as to align the composite laminated iron core.

12. The method for manufacturing the laminated iron core according to claim 1, wherein the dummy laminated part is temporarily bonded by caulking.

13. A method for manufacturing a laminated iron core, the method comprising:
  blanking and forming enlarged iron core pieces including iron core pieces and dummy piece parts;
  aligning and laminating the enlarged iron core pieces to form a composite laminated iron core that integrally includes the laminated iron core, formed from a lamination of the iron core pieces, and a dummy laminated part, formed from a lamination of the dummy piece parts, wherein the dummy laminated part is temporarily bonded;
  removing the dummy laminated part and releasing the enlarged iron core pieces from constraint caused by the temporary bonding of the dummy laminated part, thereby reducing warp occurring in the enlarged iron core pieces as a result of the constraint, and obtaining the laminated iron core;
  placing the laminated iron core on a jig and positioning the laminated iron core; and
  mutually bonding each of the iron core pieces of the laminated iron core after the dummy laminated part is removed.

14. The method for manufacturing the laminated iron core according to claim 13, wherein a resin bond part of the laminated iron core is filled with a resin to mutually bond each of the iron core pieces.

15. The method for manufacturing the laminated iron core according to claim 13, wherein the laminated iron core is annealed before being placed on the jig.

16. The method for manufacturing the laminated iron core according to claim 13, wherein the jig is a conveyance jig including a placement table and a guide member erected on the placement table.

17. The method for manufacturing the laminated iron core according to claim 13, wherein the composite laminated iron core is formed of a unit block iron core.

18. The method for manufacturing the laminated iron core according to claim 17, wherein a plurality of unit block iron cores are laminated to form the composite laminated iron core.

19. The method for manufacturing the laminated iron core according to claim 17, wherein the unit block iron core is formed of a divided core that is a segment of an annular laminated iron core divided in a circumferential direction, and
   wherein the dummy laminated part is connected to the divided core.

20. The method for manufacturing the laminated iron core according to claim 13, wherein the composite laminated iron core includes a stator laminated iron core and the dummy laminated part, and
   the dummy laminated part is formed on a radial inside of the stator laminated iron core, a radial outside of the stator laminated iron core, or inside space located between adjacent magnetic pole parts.

21. The method for manufacturing the laminated iron core according to claim 13, wherein the composite laminated iron core includes a rotor laminated iron core and the dummy laminated part, and
   the dummy laminated part is formed on a radial inside of the rotor laminated iron core, a radial outside of the rotor laminated iron core, or inside a through hole formed in the rotor laminated iron core.

22. The method for manufacturing the laminated iron core according to claim 13, further comprising:
   positioning a part of the jig at an inner diameter side of the laminated iron core so as to align the laminated iron core.

23. The method for manufacturing the laminated iron core according to claim 22, further comprising:
   providing the part of the jig at the inner diameter side as a core member; and
   positioning the core member within an inner diameter of the laminated iron core at the inner diameter side thereof so as to align the laminated iron core pieces.

24. The method for manufacturing the laminated iron core according to claim 13, wherein the dummy laminated part is temporarily bonded by caulking.

* * * * *